United States Patent [19]

Turanyi

[11] 4,345,766
[45] Aug. 24, 1982

[54] APPARATUS FOR SEALING AN OIL WELL PUMP POLISHED ROD

[76] Inventor: Sandor Turanyi, P.O. Box 845, Stafford, Tex. 77477

[21] Appl. No.: 261,539

[22] Filed: May 7, 1981

[51] Int. Cl.³ .......................... E21B 33/08; F16J 15/56
[52] U.S. Cl. ......................................... 277/30; 277/31; 277/106; 277/110; 277/124; 166/84
[58] Field of Search ..................... 277/30, 31, 58, 66, 277/105, 106, 101, 110, 111, 123, 124, 126, 193, 225; 166/82–84

[56] References Cited

U.S. PATENT DOCUMENTS

| | | |
|---|---|---|
| 343,003 | 6/1886 | Brownell . |
| 595,675 | 12/1897 | Dudley . |
| 731,156 | 6/1902 | Berryman . |
| 834,337 | 10/1906 | Titus ............................ 277/106 X |
| 1,504,901 | 8/1924 | Rogers . |
| 1,778,228 | 10/1930 | Reschke . |
| 1,799,335 | 4/1931 | Waddell . |
| 2,119,033 | 5/1938 | Andrew ............................ 286/32 |
| 2,490,333 | 12/1949 | Basham ............................ 285/90 |
| 2,567,479 | 9/1951 | Hebard ............................ 286/16 |
| 2,608,424 | 8/1952 | Everett ............................ 277/106 |
| 3,002,776 | 10/1961 | Tschappat ...................... 277/105 X |
| 3,095,627 | 7/1963 | Johnson ............................ 166/82 X |
| 3,135,534 | 6/1964 | Basham ........................... 277/30 X |
| 3,186,722 | 6/1965 | Johnston ............................ 277/32 |
| 3,468,374 | 9/1969 | Reeves ............................ 166/84 |
| 3,787,060 | 1/1974 | Astill ............................ 277/69 |
| 3,815,925 | 6/1974 | Mattoon ............................ 277/2 |
| 3,887,196 | 6/1975 | Renfrow ............................ 277/2 |
| 4,185,837 | 1/1980 | Greene ............................ 277/27 |

*Primary Examiner*—Robert S. Ward, Jr.
*Attorney, Agent, or Firm*—Pravel, Gambrell, Hewitt, Kirk & Kimball

[57] ABSTRACT

An apparatus having a tubular housing adapted for securing to a wellhead of an oil well for sealing a reciprocating oil well pump polished rod extending through the tubular housing. The housing is formed in two operating tubular portions that are connected to enable limited angular movement therebetween, but which are resiliently urged to maintain longitudinal alignment of the two portions. A plurality of longitudinally spaced packing rings carried in one of the housing portions effects the wellhead leakage blocking seal with the reciprocating polished rod. Upper and lower rod scrapers protect the spaced seals from contact with undesired foreign matter that may be carried by the polished rod or that will damage the seals. A pair of guide bushings located adjacent the seals maintains longitudinal alignment of the seal carrying housing portion with the polished rod.

5 Claims, 1 Drawing Figure

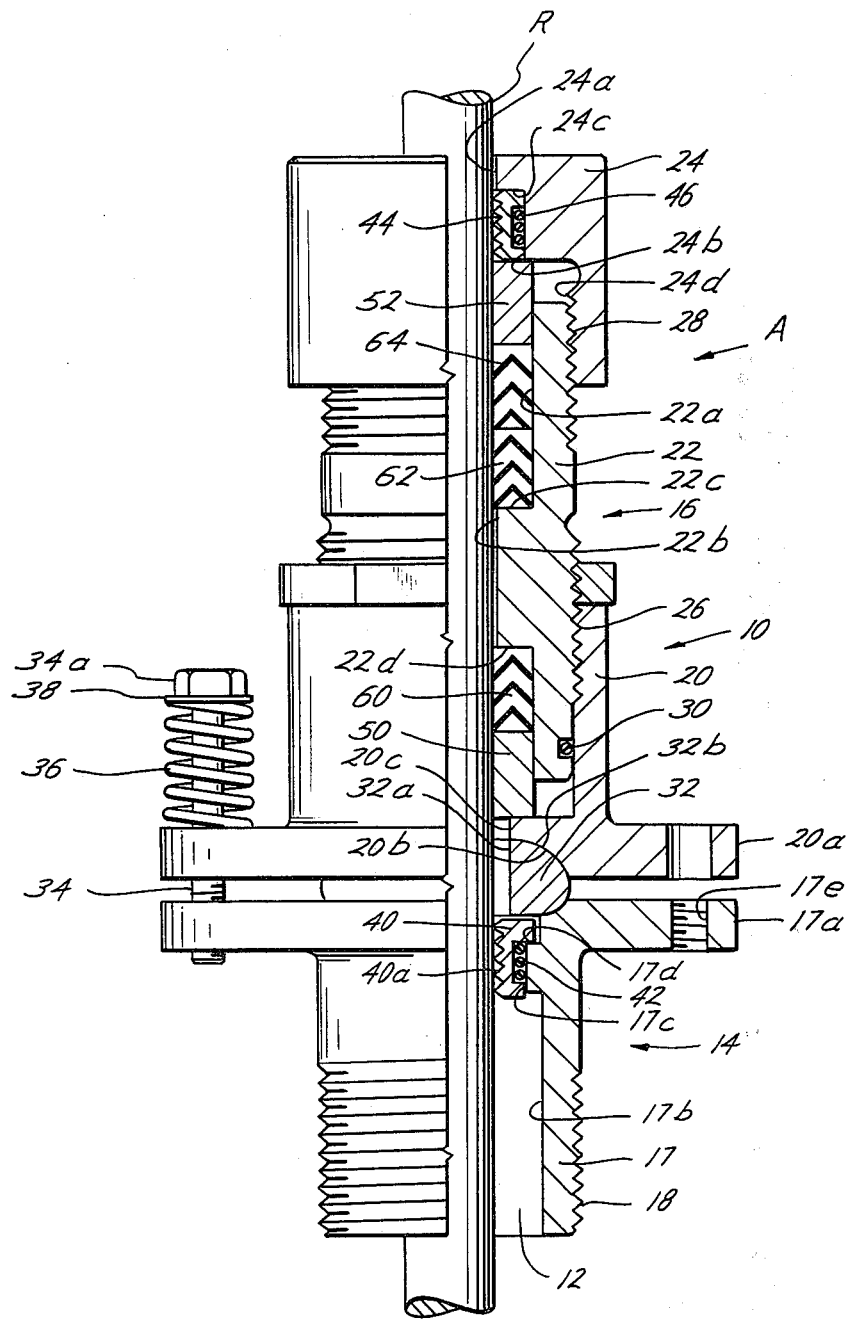

APPARATUS FOR SEALING AN OIL WELL PUMP POLISHED ROD

DESCRIPTION

1. Technical Field

This invention relates to the sealing of a reciprocating oil well pump polished rod.

During the oil well pumping operation, there is normally a sufficient flow of liquid hydrocarbons produced from the well to both lubricate and cool the wellhead seal with the reciprocating polished rod. However, if the pump loses suction or for some other reason the flow of cooling liquid hydrocarbons is interrupted, the seal is quickly subjected to high operating temperature as a result of the increasing friction and which can result in rapid failure of the seal.

The fluid properties and composition of the liquid hydrocarbons produced from these wells vary greatly between hydrocarbon producing formations. As the seal units rely upon the contained well fluid to provide both cooling and lubrication, the well fluids normally are in contact with the seals and thereby provide the working environment for the seal apparatus. Some producing formations are notorious for the adverse operating environment created by the produced fluids for the sealing unit. Well fluids are often produced at high temperatures or with entrained abrasive material. In some wells the produced fluid is extremely corrosive. In the past, it has been necessary to replace the fluid seals of units exposed to well fluids having extreme adverse properties as frequently as on a daily basis. Such frequent replacement was required regardless of whether the well fluid flow was interrupted.

Maintaining the reciprocating polished rod aligned with the sealing elements has also presented mechanical operating problems. The movement of the surface pumping unit has tended to move the relatively flexible reciprocating polished rod out of longitudinal alignment with the seals and thereby create additional sealing difficulties.

2. Background Art

This invention relates generally to stuffing boxes for sealing with reciprocating operating rods and in particular to oil well stuffing boxes or sealing units for reciprocating pump polished rods.

In pumping of oil wells it was quickly recognized that polished rod stuffing and wiper boxes having a movable aligning capability had a longer operating time expectancy due to the lateral flexing movement of the polished rod when reciprocating to operate the downhole pump. Such flexing arrangements and resulting desirable operating benefits are disclosed in U.S. Pat. Nos. 2,490,333; 3,815,925 and 3,887,196.

Many stuffing boxes having an angular alignment compensating capability are provided with a biasing arrangement to center the unit. A plurality of springs may be arranged about the polished rod to maintain radially slidable stuffing box housing members arranged on a centered or common longitudinal axis with that of the reciprocating polished rod. External spring biasing arrangements for that general purpose are disclosed in U.S. Pat. Nos. 1,504,901; 1,799,335; 2,119,033; and 3,787,060. Use of an internal biasing spring arrangement is disclosed in the seal assemblies of U.S. Pat. Nos. 343,003 and 2,567,479, while a concentric external single spring arrangement is disclosed in U.S. Pat. No. 731,156.

As noted previously, a major reason for failure of such polished rod sealing apparatus is high temperatures. If a well is pumping or producing liquid hydrocarbons (commonly referred to as crude) the well liquids serve as both a coolant and a lubricant to the sealing apparatus and particularly the sealing faces. When the well pumps dry, even for a brief period of time, the sealing apparatus is subject to very high operating temperatures which accelerates failure of the sealing faces.

Various arrangements to increase the reliability and useful life of the units by shielding the polished rod seal or seals with associated wipers or rod scrapers from dust and other abrasive contamination which may reduce the operating life of the seals are also disclosed in the previously mentioned patents. Such scrapers protect the seals from external and well internal undesired abrasive material or other matter on the reciprocating polished rod that may be carried into contact with the seals by rod movement.

Additional examples of sealing units for reciprocating polished rods are disclosed in U.S. Pat. Nos. 595,675; 1,778,228 and 3,186,722, while a fluid seal with lubricated sealing surfaces is disclosed in U.S. Pat. No. 4,185,837.

DISCLOSURE OF THE INVENTION

This invention relates to a new and improved polished rod sealing apparatus.

The sealing apparatus includes a tubular seal housing having a longitudinally extending central bore formed therethrough. The housing is adapted to be releasably mounted at its lower end with the wellhead with the housing bore aligned with the bore of the well tubing. The housing is formed in two tubular portion which are connected to enable limited angular movement therebetween to compensate for polished rod misalignment during reciprocation. The movable portion of the housing that is aligned with the polished rod carried a pair of seals or packing rings for blocking leakage of fluid from the wellhead. Also secured in the bore of the movable portion of the housing are a pair of spaced guide bushings for limiting the lateral movement of a polished rod in the bore of the housing within a preselected range. Also disposed in the bore of the movable housing portion is one or more scraper rings for blocking passage of undesired abrasive matter to the seals.

An object of the present invention is to provide a new and improved apparatus for sealing about an oil well pump polished rod.

A further object of the present invention is to provide a new and improved sealing apparatus for an oil well pump polished rod.

DESCRIPTION OF THE DRAWING

The FIGURE is a side view, partially in section, of the sealing apparatus of the present invention with the reciprocating polished rod operably positioned therein.

DETAILED DESCRIPTION

The sealing apparatus of the present invention, generally designated A in the FIGURE, is illustrated partially in section. The apparatus A functions to seal a conventional wellhead (not illustrated) with a reciprocating polished rod R that extends therethrough. The polished rod R functions to transmit the reciprocating movement of the well surface pumping equipment (not illustrated) to the subsurface or downhole pump unit (also not illustrated). It is this downhole pump that pressurizes the liquid well fluid, having the potentially undesirable fluid characteristics or properties from the hydrocarbon producing formation, that is sealed in the wellhead by the apparatus A of the present invention. While the apparatus A of the present invention is contemplated for use in oil field pumping operations, it is to be understood that the sealing apparatus A may be utilized with equal suitability in other applications.

The surface pumping unit is connected to the subsurface pump by the use of lengths or sections of sucker rods. One section or joint of sucker rod is known as the polished rod R and is formed of a substantially constant diameter portion having a hardened and extremely smooth outer surface for enabling sealing of the wellhead with the reciprocating sucker rod string. Such arrangement is well known to those skilled in the art and need not be set forth in detail hereinafter.

The sealing apparatus A of the present invention includes a substantially tubular outer housing generally designated 10. The housing 10 is formed with a longitudinally extending central bore 12 extending therethrough in which the polished rod R is concentrically positioned for sealing therewith.

The tubular housing 10 is operably formed by a first or lower tubular housing portion 14 and an upper or second tubular housing portion, generally indicated at 16, with the upper tubular housing portion 16 operably connected with the lower housing portion 14 for enabling limited relative angular movement therebetween.

The lower housing portion generally indicated at 14 includes a lower sleeve 17 having an external helical thread 18 formed thereon to enable operably securing of the apparatus A with the wellhead of the hydrocarbon producing well having the polished rod R extending therefrom. The connection of the thread 18 with the wellhead also operably longitudinally aligns the bore 12 of the housing 10 with the polished rod R in the usual concentric manner. The connection of the apparatus A of the present invention with the wellhead 18 utilizing the thread 18 is conventional and well known to those skilled in the art.

The lower sleeve member 17 forms at its upper end an outwardly extending flange or collar 17a while a substantially constant diameter inner surface 17b forms the longitudinally extending bore opening 12 defining a portion of the longitudinal axis in the conventional manner. The inner surface 17b is formed on a substantially constant diameter provided with an annular inwardly projecting collar 17c which forms an upwardly facing annular stop shoulder 17d for a purpose to be described more fully hereinafter.

The upper tubular housing portion, generally designated 16, is formed by a series of three connected sleeves 20, 22 and 24 that are operably secured by adjustable threaded engagement at 26 and 28 in the usual manner. The lower housing sleeve 20 is provided with an outwardly extending flange 20a that is a companion mating unit to the flange 17a of the tubular member 17. The flanges 20a and 17a are operably connected, but maintained apart a preselected distance for a purpose to be more fully described hereinafter.

The intermediate body or sleeve 22 carries an O-ring 30 for blocking leakage of fluid along the threaded engagement at 26 with the lower housing sleeve 20. The substantially constant diameter inner surface 22a of the intermediate sleeve 22 is also provided with an inwardly projecting collar 22b providing an upwardly facing annular shoulder 22c and a downwardly facing annular shoulder 22d for purposes to be more fully described hereinafter.

The adjusting nut or upper housing sleeve 24 is provided with a constant diameter inner surface 24a disposed closely adjacent the polished rod R. The inner surface 24a is provided with a larger diameter portion 24b having a downwardly facing annular shoulder 24c for a purpose to be described more fully hereinafter. An even larger diameter portion 24d forms the threads for engagement at 28 with the intemediate sleeve 22.

The lower housing 14 further includes a concentrically mounted housing swivel bushing 32 having an inner surface 32a that is also concentrically aligned with the bore 12 for enabling longitudinally reciprocating operating movement of the polished rod R. The swivel bushing 32 is provided with a curved slide surface 32b which engages a corresponding complementary surface 20b formed on the lower sleeve 20 adjacent the bore defining constant diameter surface 20c of the upper housing member 16. It is to be understood the slide and complimentary surfaces may be reversed in position without departing from the scope of the present invention.

The flange 17a on the lower tubular housing member 17 is provided with a plurality of circumferentially spaced tapped or threaded openings 17d for receiving corresponding connecting bolts 34 therein. The bolts 34 are provided with the usual enlarged hex head 34a for making up with the flange 17a in the usual manner. A spring 36 is concentrically mounted about the bolt 34 for engaging a washer 38 disposed adjacent the bolt head 34a and the flange 20a for urging the flange 20a towards the flange 17a. The plurality of radial springs 36 serve to hold the complimentary surface 20b in engagement with the sliding surface 32b of the swivel bushing 32 for normally centering the lower housing portion 14 and the upper housing portion 16. The resilient urging of the springs 36 enables relative movement on the sliding surface 32b of the complimentary surface 20b for enabling the angular movement of the upper housing portion 16 relative to the lower housing portion 14 which is secured to the wellhead H. Such angular movement will compensate for misalignment of the polished rod or in its reciprocating movement in the usual manner.

Mounted in the board 12 adjacent the collar 17c is a lower or first polish rod scraper ring 40 having an inner surface 40a formed with a plurality of pointed annular ridges 40a for contacting the polish rod R to prevent passage of abrasive material or paraffin build-up and the like on the polish rod R into the upper housing portion 16 during reciprocating movement of the polished rod R. A concentric spring 42 is partially mounted about the scraper ring 40 for movably mounting with the housing sleeve 17 in the usual manner. The use of biasing spring 42 enables sufficient movement of the scraper ring 40 to prevent binding on the polished rod R during the reciprocating operation thereof.

A similar rod scraper ring 44 is mounted with the upper housing sleeve 24 in a similar manner. A concentric mounting spring 46 enables positioning of the upper rod scraper ring 44 in a similar manner. The rod scraper rings 40 and 44 prevent entry of abrasive material into the sealing apparatus A by the movement of the polished rod R in either direction. The split polished ring 40 and 44 are held by the springs 42 and 46, respectively, against separation and in contact with the polished rod R as is well known to those skilled in the art.

Located immediately above the flange 20a of the sleeve 20 is a first or lower polished rod guide bushing 50 and upper or second guide bushing 52 is disposed in the bore 12 immediately adjacent the upper rod scraper 44. Preferably, the bushings 50 and 52 are split to enable the replacement without the necessity to disassemble the entire sealing apparatus A. The spaced guide bushings 50 and 52 control the angular positioning of the upper housing portion 16 to insure alignment with the reciprocating polished rod R by maintaining the concentric relationship of the upper housing portion 16 with the polished rod R in the usual manner.

Located between the guide bushings 50 and 52 are the Chevron seal packing units 60, 62 and 64 for effecting the flow blocking seal between the upper housing portion 14 and the polished rod R. The sliding seal so effected prevents the leakage of fluid from the wellhead in the desired manner. The Chevron packing 60, 62 and 64 preferably longitudinally split to enable its replacement without entirely disassembling the sealing apparatus A in the usual manner. The selection of materials for the packing units 60, 62 and 64 is controlled by the type of well fluids encountered from producing formation of the well and are known to those of ordinary skill in the art.

In the use and operation of the present invention, the apparatus A is secured to the wellhead using the thread 18 in the usual manner. The apparatus is then assembled in the manner illustrated about the polished rod R. The threaded engagement at 26 is used to control the seal effected by the packing 60 with the polished rod R in the usual manner. Likewise, the threaded engagement 28 is used to compress the packing 62 and 64 for effecting its seal with the polished rod R in a similar manner. The separate adjusting means are provided for each of the two sealing units with the polished rod R for maintaining the sliding seal.

The foregoing disclosure and description of the invention are illustrative and explanatory thereof, and various changes in the size, shape and materials, as well as in the details of the illustrated construction may be made without departing from the spirit of the invention.

I claim:

1. An apparatus for effecting a seal with a reciprocating polished rod member of substantially constant diameter to block leakage of fluid therebetween, including:
   a substantially tubular housing having a longitudinal bore extending therethrough in which said substantially constant diameter reciprocating polished rod member is positioned for sealing therewith, said tubular housing having means for operably securing with a wellhead of the a hydrocarbon producing well having the polished rod member extending therefrom;
   said tubular housing having a first tubular housing portion and a second tubular housing portion, said second tubular housing portion connected with said first tubular housing portion by means for enabling limited relative angular movement therebetween, said first housing portion securable with the wellhead;
   a first polished rod scraper disposed in said bore and movably mounted with said first housing portion, said first rod scraper having an inner surface disposed closely adjacent said polished rod for blocking passage of undesired solid matter therebetween;
   a second polished rod scraper disposed in said bore and movably mounted with said second housing portion, said second rod scraper having an inner surface disposed closely adjacent said polished rod for blocking passage of undesired solid matter therebetween;
   a first polished rod guide bushing mounted with said second housing portion and disposed in said bore adjacent said first housing portion, said first guide bushing having an inner surface arranged for contacting said polished rod for establishing the relative radial relationship therebetween;
   a second polished rod guide bushing mounted with said second housing portion and disposed in said bore adjacent said second polished rod scraper, said second guide bushing having an inner surface arranged for contracting said polished rod for establishing the relative radial relationship therebetween, said first and second guide bushings spaced apart a sufficient distance for maintaining said second housing portion longitudinally aligned with said polished rod; and
   means mounted with said second housing portion and disposed in said bore between said first and said second guide bushings for effecting a sliding seal between said second housing portion and the polished rod to block leakage of wellhead fluid therebetween.

2. The apparatus as set forth in claim 1, wherein said means for connecting said first housing portion and said second housing portion includes:
   a slide surface formed on one of said housing portions;
   a complementary surface formed on the other of said housing portions and contacting said slide surface for enabling relative movement therebetween to provide for the relative angular movement between said housing portions; and
   means mounted with said housing portions for resiliently urging said first housing portion and said second housing portion into engagement for maintaining slide surface and said complementary surface into sealing contact.

3. The apparatus as set forth in claim 2, wherein:
   said slide surface and said complentary surface are shaped to longitudinally align said first housing portion and said second housing portion in response to said means for resiliently urging.

4. The apparatus as set forth in claim 3, wherein:
   said slide surface is rounded.

5. The apparatus as set forth in claim 1, wherein said means for includes:
   a first packing ring disposed adjacent said first polished rod guide bushing for sealing with said polished rod; and
   a second packing ring disposed adjacent said second polished rod guide bushing and spaced from said first packing ring for sealing with said polished rod.

* * * * *